Aug. 21, 1928.
C. W. HAMMETT
1,681,182
WHEEL
Filed Sept. 1, 1926   2 Sheets-Sheet 1
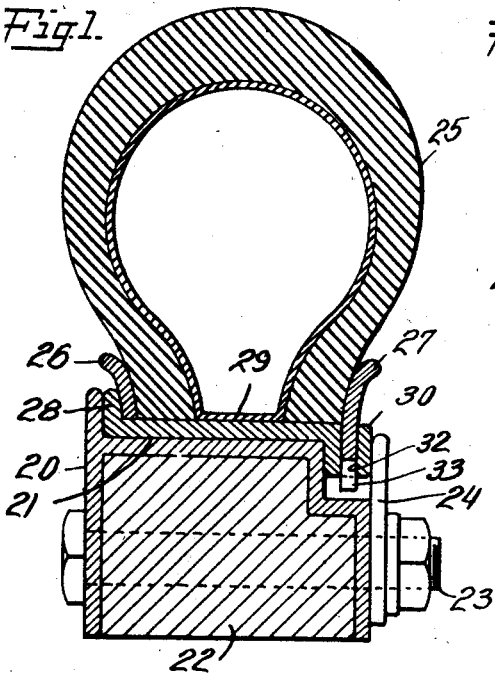
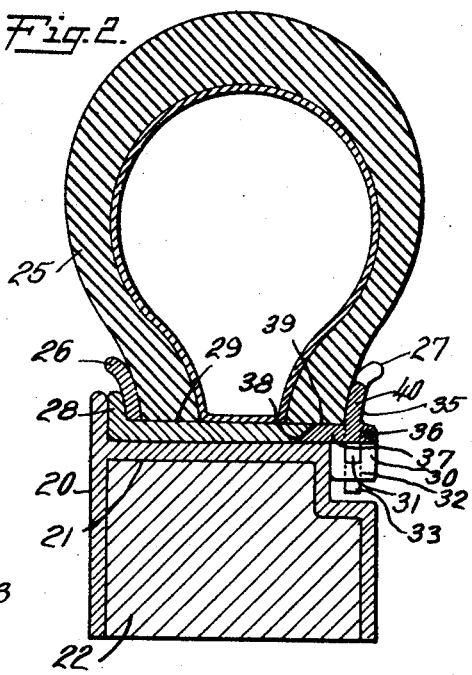
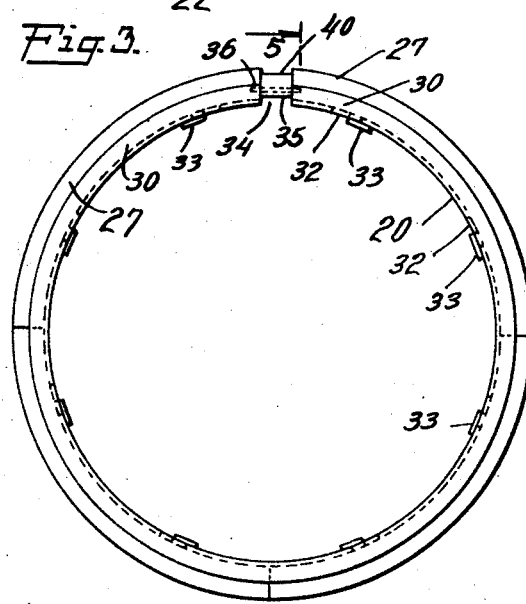
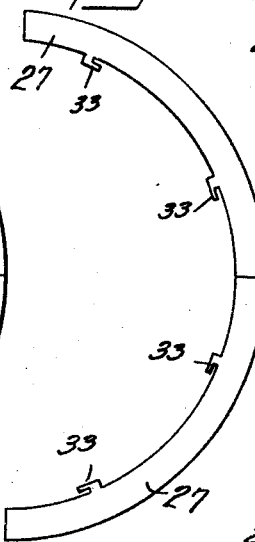
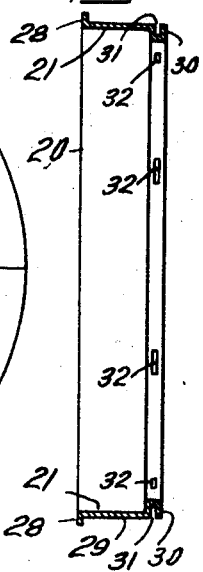
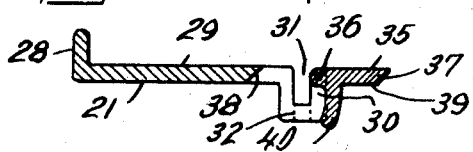
INVENTOR
Charles W. Hammett
BY
Pennie, Davis, Marvin, & Edmonds
ATTORNEYS Aug. 21, 1928.
C. W. HAMMETT
1,681,182
WHEEL
Filed Sept. 1, 1926   2 Sheets-Sheet 2
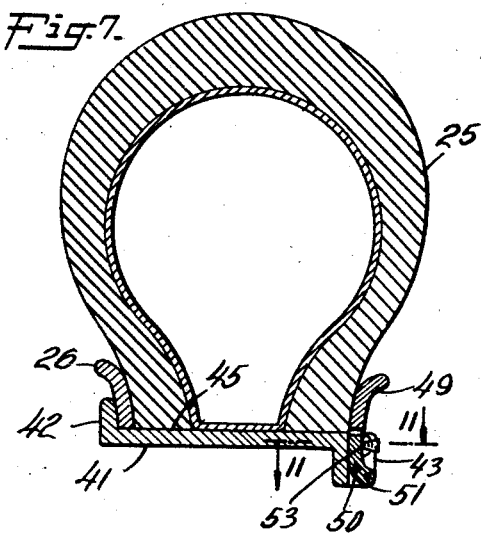
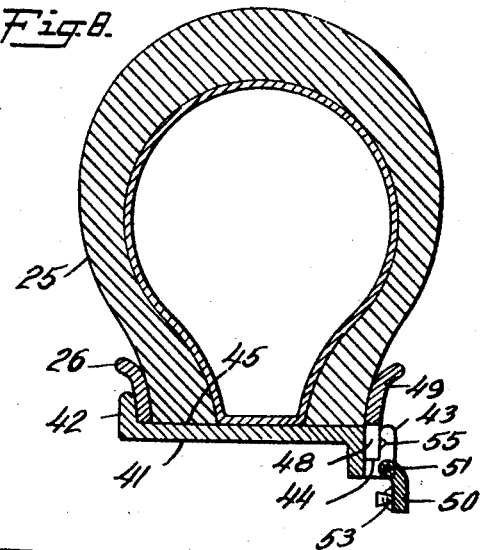
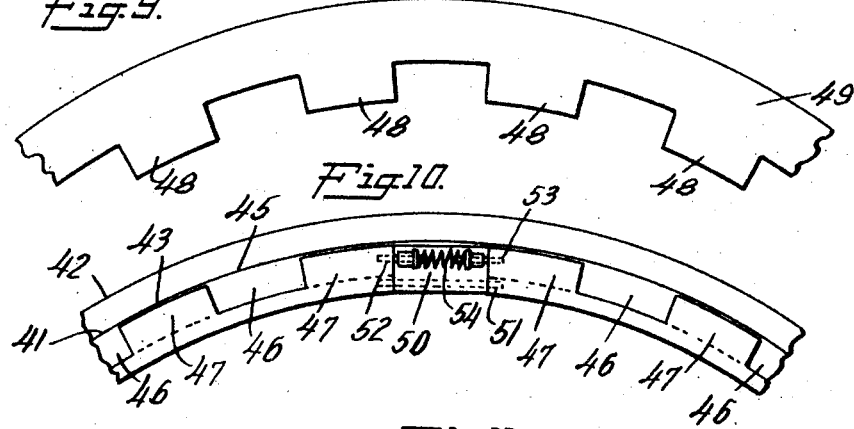
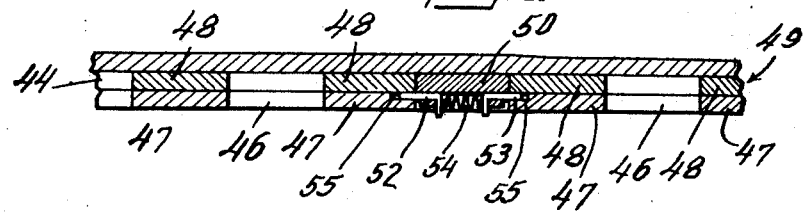
INVENTOR
Charles W. Hammett
BY
Pennie, Davis, Marvin, & Edmonds
ATTORNEYS Patented Aug. 21, 1928.

1,681,182

UNITED STATES PATENT OFFICE.

CHARLES W. HAMMETT, OF PORT WASHINGTON, NEW YORK.

WHEEL.

Application filed September 1, 1926. Serial No. 132,937.

This invention relates to wheels and has for its object the provision of an improved wheel and an improved wheel rim adapted to be fitted with rubber tires and the like.

In the mounting of automobile wheels, for example, with rubber tires, it is highly desirable that the wheel rims should be so constructed that the tires may be removed and replaced with a minimum of effort and time.

In the practice of my invention on automobile wheels it becomes possible to very quickly take off and put on rubber tires. The wheels and wheel rims are so constructed that the rim may be readily and securely attached to the felloe of the wheel and so that tire clamping means may be promptly attached to and removed from the rim.

The main rim member, about which the tire fits, is in turn so constructed that when the tire clamping means are removed, there is no rim impediment to the mounting or demounting of a tire. In other words, free access is provided to the top surface of the rim for the insertion thereon or the removal therefrom of a tire.

Thus, my invention provides for the combination in a wheel of a main rim member adapted to be attached about the felloe of the wheel, circumferential shoulders on the inner and outer sides of the rim member, the inner shoulder extending beyond the top surface of the rim member, a recessed channel adapted to contain tire clamping means being interposed adjacent the outer shoulder, the top of the outer shoulder not extending beyond the top surface of the rim member, and means associated with the outer shoulder for locking tire clamping means in the channel.

My invention will be more clearly understood by reference to the attached drawings, taken in conjunction with the following description, in which:

Fig. 1 is a part sectional end elevation of a wheel and rim on which is shown a conventional rubber tire secured by clamping means;

Fig. 2 is a part sectional end elevation similar to Fig. 1, but showing the locking device for holding the tire clamping means in position;

Fig. 2 is a side elevation in part of Figs. 1 and 2, showing the tire clamping means locked into the main rim member.

Fig. 4 is a side elevation in part of Figs. 1, 2, and 3, showing the tire clamping means in segments;

Fig. 5 is a section on the line 5—5 of Fig. 3;

Fig. 6 is a detail of the main rim member from Fig. 2, showing the tire clamp locking means in the open position.

The second sheet of drawings shows a modification of the invention in which;

Fig. 7 is a part sectional end elevation of a rim mounted with a conventional rubber tire; the tire clamp locking means being shown in the closed position;

Fig. 8 is a part sectional end elevation similar to Fig. 7, but showing the tire clamp locking means in the open position;

Fig. 9 is a part side elevation of the tire clamping means shown in Figs. 7 and 8;

Fig. 10 is a part side elevation of Figs. 7 and 8, showing the tire clamps removed from the main rim member; and Fig. 11 is a section on the line 11—11 of Fig. 7.

The wheel portion 20 shows the main rim member 21 appropriately mounted upon the felloe 22 by means of the bolts 23 extending through the wheel proper, and pressing the lugs 24 tightly against the main rim member. A conventional tire 25 is in turn shown mounted upon the main rim member, being retained in position on the rim by the clamping means 26 and 27, which preferably have their ends beaded to prevent injury to the tire.

The main rim member of the embodiment of the invention shown on the first sheet of drawings shows an inner circumferential shoulder 28, which may be substantially upright so as to have fitted against it a tire clamping means 26. Or, this shoulder may itself be so constructed as to fulfill the requirements of a tire clamping means. That is to say, the shoulder may be made sufficiently high, curved, and beaded to provide an appropriate tire clamp. If the shoulder is upright, as shown in the drawings, a demountable tire clamping means of any appropriate structure may be fitted over the main rim member and brought to bear against the shoulder. Thus, the tire clamping means 26 may be so constructed that when the beaded portion is curved outwardly, the same is adapted to be used in connection with straight sided tires. If, on the other hand, the beaded portion is turned inwardly, a tire clamping means is provided which is well adapted to be used in connection with clincher tires. The same description, of course, also applies to the tire clamping means 27 placed on the outer side of the main rim member.

The top surface 29 of the main rim member is sufficiently wide to receive a tire to be mounted upon the rim. The outer circumferential shoulder 30, unlike the inner circumferential shoulder 28, has a recessed channeled portion 31 leading completely around the main rim member. This channel is so designed that the tire clamping means 27 may be easily inserted and removed therefrom. The top of the outer shoulder 30 is so constructed as not to extend up and beyond the top surface 29 of the rim. Appropriate slots 32 are spaced around the bottom of the channeled portion 31, such as to be adapted to receive the hooked locking arms 33 of the tire clamping means 27.

Tire clamping means 27 are shown in circumferential segments, which when put together do not quite complete an entire circle. That is to say, the segments must be of such size and shape as to be easily inserted into the circumferential channeled portion 31. For this purpose it is well to have two or more segments. It is of course quite evident that a single segment forming more than a semicircle could not be inserted into the channel. I have shown the use of four segments on the drawings, but it is of course evident that a smaller or larger number might be employed. The locking arms 33 are so constructed that the whole arm may be dropped through the slots 32, so that when the segments 27 are pulled downwardly, the hooked arms 33 will find themselves locked in the slots 32.

When all the segments 27 are in place in the channeled portion 31, a space 34 is provided between the upper two segments sufficient to allow for the operation of the locking means 35 which is pivotally attached to the outer shoulder 30 at the point 36. This locking means is so designed that when it is in the closed position, as shown in Fig. 2, the arm 37 will fit snugly, and in a bevel 38 in a slotted portion of the tire-resting section of the main rim member. When the locking device is in the closed position, the top surface 39 of the arm 37 will be in a plane with the top surface 29 of the main rim member 21, while the beaded arm 40 will be in substantial alignment with the tire clamping means 27.

When the locking means 35 is in the open position, such as shown in Fig. 6, the arms 37 and 40 will not in any way protrude above the top surface 29 of the main rim member. Fig. 6 shows the arm 37 dropped downwardly and turned 180°. Such a turn of two quadrants leaves the main rim member 21 in an open position, when the tire clamping means 27 have been removed, for the insertion or removal of a tire. It is also to be observed that if the arm 37 is merely dropped 90°, the arm 40 will be substantially parallel with the surface 29 of the main rim member, but will not extend up and beyond the same, so that the rim member is again in an unimpeded condition for the prompt removal or insertion of a tire.

The operation of the above described apparatus is as follows:

The main rim member 21 is mounted about the felloe 22 of the wheel 20, whereupon the nuts on the bolts 23 are appropriately turned down upon the lugs 24 in such manner as to tightly hold the main rim member 21 upon the wheel.

Tire clamping means 26 are next placed on the main rim member and pushed against the inner circumferential shoulder 28. If a straight sided tire is used, the beaded portion of the tire clamping means 26 is extended outwardly. If, on the other hand, a clincher tire is employed, the beaded portion will be turned inwardly to fit about the beaded portion of the clincher tire.

The locking device 35 is brought into such a position that it will in no way impede access to the rim member 21, whereupon the tire 25 is slipped over the main rim member 21 to rest upon its outer surface 29. As soon as the tire is in place upon the rim, the tire clamping segments 27 are appropriately fitted into the channeled portion 31 so that the hooked locking arms 33 may drop through the slots 32 and assume a locked position when the segments are given an appropriate turn.

The locking device 35 is then put into the closed position. This is accomplished by forcing the tire inwardly over the top surface 29 of the main rim member, so that the arm 40 may be circled about the pivotal point 36 into substantial alignment with the tire clamping segments 27. When this has been done, the surface 39 of the arm 37 will be brought into alignment with the top surface 29 of the rim member, and the outward pressure of the tire upon the arm 40 will keep the arm 37 tightly pressing against the beveled portion 38. Since the locking device 35 fits snugly in the space 34 provided between the segments 27, it is seen that when the locking means are in the closed position that the tire clamping segments 27 will be held in an immovable position and it becomes impossible for the hooked locking arms 33 to jump out of the slots 32.

If it is desired to remove a tire, it is at once evident that the reverse procedure need only be employed. That is to say, the arm 40 of the locking device 35 is forced inwardly, against the yielding tire, and downwardly until either the arm 40 or the arm 37 has assumed a position of substantial alignment with the top surface 29 of the main rim member. The tire clamping segments 27 are then given an appropriate turn and lifted out of the slots 32 to be removed from the channeled portion 31. The main rim member 21 is then not impeded in any way, and the tire may be promptly withdrawn.

In the modification shown on the second sheet of drawings, the tire 25 is shown mounted upon a similarly constructed main rim member 41 with an inner circumferential shoulder 42, and an outer circumferential shoulder 43. As in the previous example, a channeled portion 44 extends completely around the rim and is interposed between the outer shoulder 43 and the main section of the rim. The top of the shoulder 43 is so constructed as to not extend up and beyond the top surface 45 of the main rim member.

The outer shoulder 43 is provided with a plurality of equally spaced slots 46, see Figs. 10 and 11, with adjacently located arms 47, extending from the top to the bottom thereof, adapted to receive the locking arms 48 of the tire clamping means 49.

A locking means 50 is pivotally connected to the outer shoulder 43 at the point 51. This locking device is equipped with locking pins 52 and 53, which are in a constantly locked position by means of the spring 54. The pins 52 and 53 are adapted to fit into the grooves 55 of the outer shoulder 43.

The operation of the modification above described is as follows:

Tire clamping means 26 are placed on the main rim member 41 and pushed against the inner shoulder 42. As previously noted, if a straight sided tire is to be used, the beaded portion of the tire clamping means 26 is extended outwardly. If, on the other hand, a clincher tire is employed, the beaded portion will be turned inwardly to fit about the beaded portion of the clincher tire.

The locking device 50 being in the open position, the main rim member is in readiness to have the tire inserted thereon. As soon as the tire is in place upon the rim, the tire clamping means 49 is pushed through the spaces 46 in the outer shoulder 43 into the recessed channel portion 44. The clamp 49 is then turned until its arms 48 are directly behind the arms 47 of the shoulder 43.

In order to lock the tire clamp into position, it is now only necessary to lift and turn the locking device 50 about its pivot 51, while pulling the pins 52 and 53 inwardly, until its main body fits snugly into the space between two adjacent arms 48. The spring 54 is released and the pins 52 and 53 promptly jump into the grooves 55 of the shoulder 43.

It will again be evident that the procedure just described need only be reversed in order to go through the process of taking off a tire. The spring 50 is compressed to draw the pins 52 and 53 out of the grooves 55, whereupon the locking device 50 can be pulled outwardly and away from the space between the two arms 48 of the tire clamp 49. The clamp is turned until the arms 48 can be passed outwardly through the spaces 46 of the shoulder 43. The main rim member 41 is then in a perfectly unimpeded condition, and the tire may be promptly pulled off.

I claim:

1. In a rim made up of at least two separable members one of said members including an annular portion upon which a tire may be mounted, said member having a channel therein, a second member within said channel for maintaining the tire on the first member, a portion of the channel wall being cut away, and a latch member pivoted to the first member within the cut away portion for maintaining the second member within the channel.

2. In a rim made up of at least two separable members, one of said members including an annular portion upon which a tire may be mounted, said member having a channel therein, a second member within said channel for maintaining the tire on said first member, a portion of the channel being cut away, a latch member pivoted to said first member within said cut away portion for maintaining said second member within the channel, and means engageable with one of said members for locking said latch against pivotal movement when the parts are in assembled position.

3. In a wheel rim having a recessed channel portion on the outer side thereof, symmetrically spaced and equally sized slots in the outer shoulder of said channel portion, tire clamping means with symmetrically spaced and equally sized arms adapted to pass through said slots, and means attached to the channel portion for locking said clamping means into the channel when the arms of the clamp are moved between the slots while in the channel, including a pivoted device provided with spring operated pins, slots in the outer shoulder of the channel portion into which the pins can be pushed, said pivoted device being of such size as to fit snugly between adjacent arms of the clamp when the clamp is in the channel.

In testimony whereof I affix my signature.

CHARLES W. HAMMETT.